United States Patent
Huang

(10) Patent No.: US 9,751,466 B2
(45) Date of Patent: Sep. 5, 2017

(54) POSITION ADJUSTMENT DEVICE FOR A VEHICLE REARVIEW MIRROR

(71) Applicant: Yu-Feng Huang, Tainan (TW)

(72) Inventor: Yu-Feng Huang, Tainan (TW)

( * ) Notice: Subject to any disclaimer, the term of this patent is extended or adjusted under 35 U.S.C. 154(b) by 0 days.

(21) Appl. No.: 14/998,882

(22) Filed: Feb. 26, 2016

(65) Prior Publication Data

US 2017/0203696 A1    Jul. 20, 2017

(51) Int. Cl.
*B60R 1/06* (2006.01)
*B60R 1/08* (2006.01)

(52) U.S. Cl.
CPC .............. *B60R 1/081* (2013.01); *B60R 1/06* (2013.01); *B60R 1/0617* (2013.01)

(58) Field of Classification Search
CPC .......... B60R 1/06; B60R 1/0617; B60R 1/081
USPC .......................... 359/841, 881; 248/480, 481
See application file for complete search history.

(56) References Cited

U.S. PATENT DOCUMENTS

| | | | | |
|---|---|---|---|---|
| 1,921,310 A * | 8/1933 | Crisman | ............... | B60R 1/0617 248/287.1 |
| 2,134,016 A * | 10/1938 | Zink | .......................... | B60R 1/06 248/122.1 |
| 2,488,316 A * | 11/1949 | Mosby | .................. | B60R 1/0617 248/279.1 |
| 2,526,306 A * | 10/1950 | Van Gelder | ............. | B60R 1/078 248/279.1 |
| 2,573,443 A * | 10/1951 | Holland | .................. | B60R 1/078 116/173 |
| 2,705,122 A * | 3/1955 | Whitehead | ................ | B60R 1/06 248/286.1 |
| 3,107,077 A * | 10/1963 | Lassa | .................... | B60R 1/0617 248/478 |
| 5,513,048 A * | 4/1996 | Chen | ....................... | B60R 1/078 248/223.41 |
| 7,594,731 B2 * | 9/2009 | Sinelli | ..................... | B60R 1/025 248/479 |

* cited by examiner

*Primary Examiner* — Ricky D Shafer
(74) *Attorney, Agent, or Firm* — Alan D. Kamrath; Kamrath IP Lawfirm, P.A.

(57) ABSTRACT

A position adjustment device for a vehicle rearview mirror adjusts the linear distance between the rearview mirror and the vehicle body to which the rearview mirror is configured. A driver may use the position adjustment device to adjust a visibility range according to driving needs. The position adjustment device includes a mounting unit and a length adjusting unit. The mounting unit is used to combine together with a vehicle body. The length adjusting unit has an end coupled with the mounting unit by a combining unit and an opposing end combined with a vehicle rearview mirror by a joining unit.

5 Claims, 9 Drawing Sheets

POSITION ADJUSTMENT DEVICE FOR A VEHICLE REARVIEW MIRROR

BACKGROUND OF THE INVENTION

Field of the Invention

The present invention relates to a position adjustment device for a vehicle rearview mirror and, in particular, to a position adjustment device that adjusts the linear distance/position between the rearview mirror and the vehicle body to which the rearview mirror is affixed to suit the driver's needs.

Description of the Prior Art

A vehicle rearview mirror is designed to allow the driver to see rearward to observe the traffic behind to be able to react to traffic conditions immediately to avoid dangers. A prior art vehicle rearview mirror is fixed by a fasten device having one end mounted to the vehicle body and the other end combined with the vehicle rearview mirror. The prior art vehicle rearview mirror only allows its angles to be adjusted. The user can not adjust the linear distance between the rearview mirror and the vehicle body to a requested position to fit needs. Thus, it is possible to cause blind spots in the driver's visual field and further to cause traffic dangers. Therefore, the aforesaid structure needs to be improved. It is against the background and the drawbacks associated therewith that the present invention has been developed.

SUMMARY OF THE INVENTION

It is a primary objective of the present invention to provide a position adjustment device for a vehicle rearview mirror that adjusts the linear distance/position between the rearview mirror and the vehicle body to which the rearview mirror is affixed.

In order to achieve the aforesaid objective, the position adjustment device for a vehicle rearview mirror disclosed in the present invention comprises a mounting unit and a length adjusting unit. The mounting unit is used for combining together with a vehicle body. The length adjusting unit has an end coupled with the mounting unit by a combining unit and an opposing end combined with a vehicle rearview mirror by a joining unit. The length adjusting unit includes an inserting member and a receiving member. The interior of the receiving member is provided with a sliding channel extending axially. The sliding channel provides a channel opening facing the inserting member to allow the inserting member to insert into the sliding channel via the channel opening. The inserting member provides a concave groove extending axially. The receiving member is provided with a threaded hole facing the concave groove to allow insertion of a bolt. After the bolt inserts into the threaded hole, the end surface of the bolt may tightly touch a concave surface of the concave groove by screwing the bolt, so that the inserting member and the receiving member are combined together and secured. By adjusting the position of the inserting member, a user may adjust the linear distance and position between the rearview mirror and the vehicle body to which the rearview mirror is mounted according to driving needs.

BRIEF DESCRIPTION OF THE DRAWINGS

In order that the present invention may be more fully understood, preferred embodiments thereof will now be described with reference to the accompanying drawings, in which.

DESCRIPTION OF THE PREFERRED EMBODIMENTS

The means for achieving the aforesaid objective and the functions of the present invention will become apparent from the following description, taken in connection with the accompanying drawings, and preferred embodiments of the present invention are disclosed.

Figure 1:
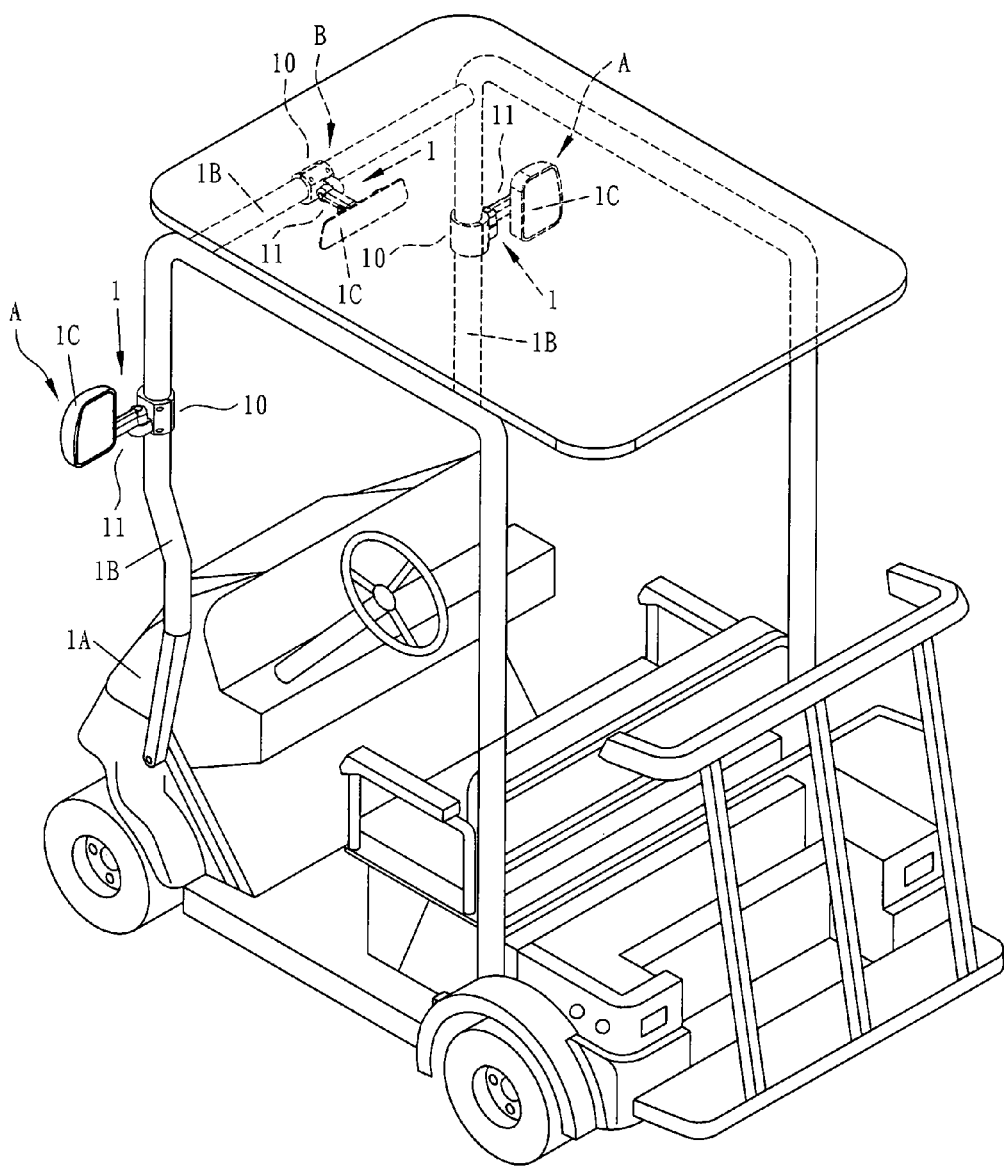
FIG. 1 is a schematic diagram showing the mounted positions of the present invention.
Figure 2:
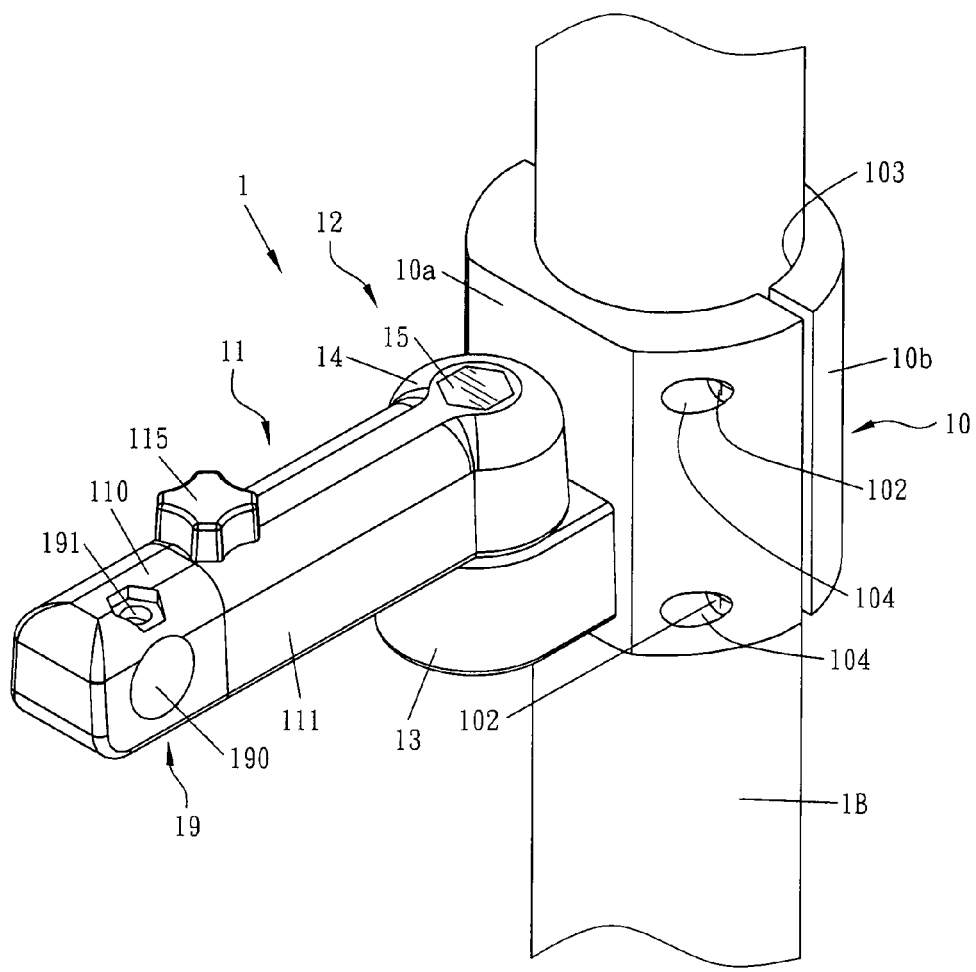
FIG. 2 is a stereogram showing the combination of a first embodiment of the present invention.

FIG. 1 shows a position adjustment device for a vehicle rearview mirror disclosed in the present invention. The position adjustment device for a vehicle rearview mirror is allowed to be arranged not only to an outside rearview mirror of a vehicle, as shown in place A of FIG. 1, but also to an inside rearview mirror of a vehicle, as shown in place B of FIG. 1. The position adjustment device 1 for a vehicle rearview mirror in accordance with a first embodiment of the present invention comprises a mounting unit 10 and a length adjusting unit 11.

The mounting unit 10 is used for combining together with a vehicle body 1A (such as combined with a fixed rod 1B of a vehicle), as shown in FIG. 1. The vehicle body 1A may be a golf buggy body, and the fixed rod 1B may be arranged respectively to the left and right sides of the front end of the vehicle body 1A or may be configured over the front seats inside the vehicle.

Figure 3:
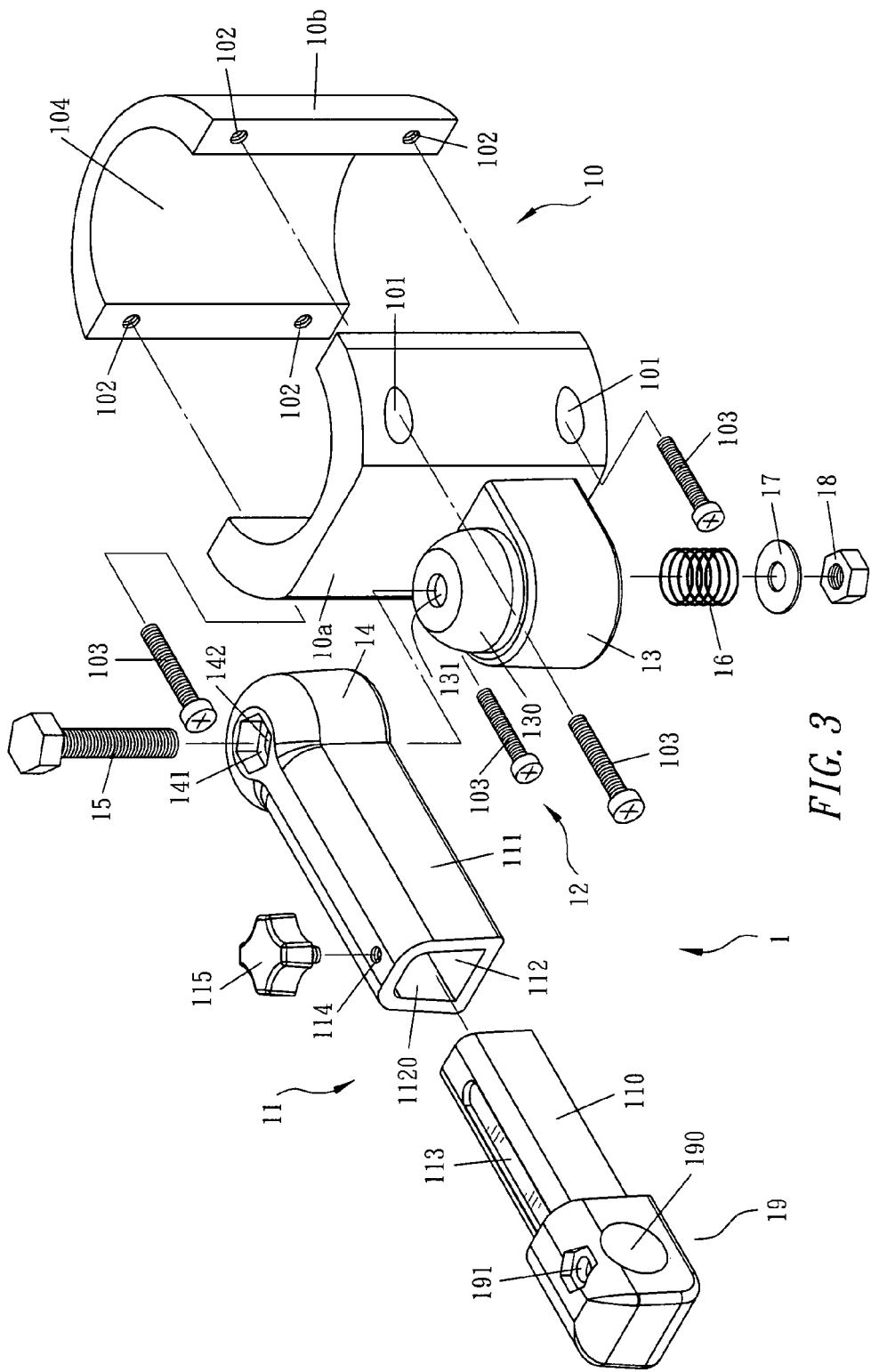
FIG. 3 is a breakdown stereogram of the first embodiment of the present invention.
Figure 4:
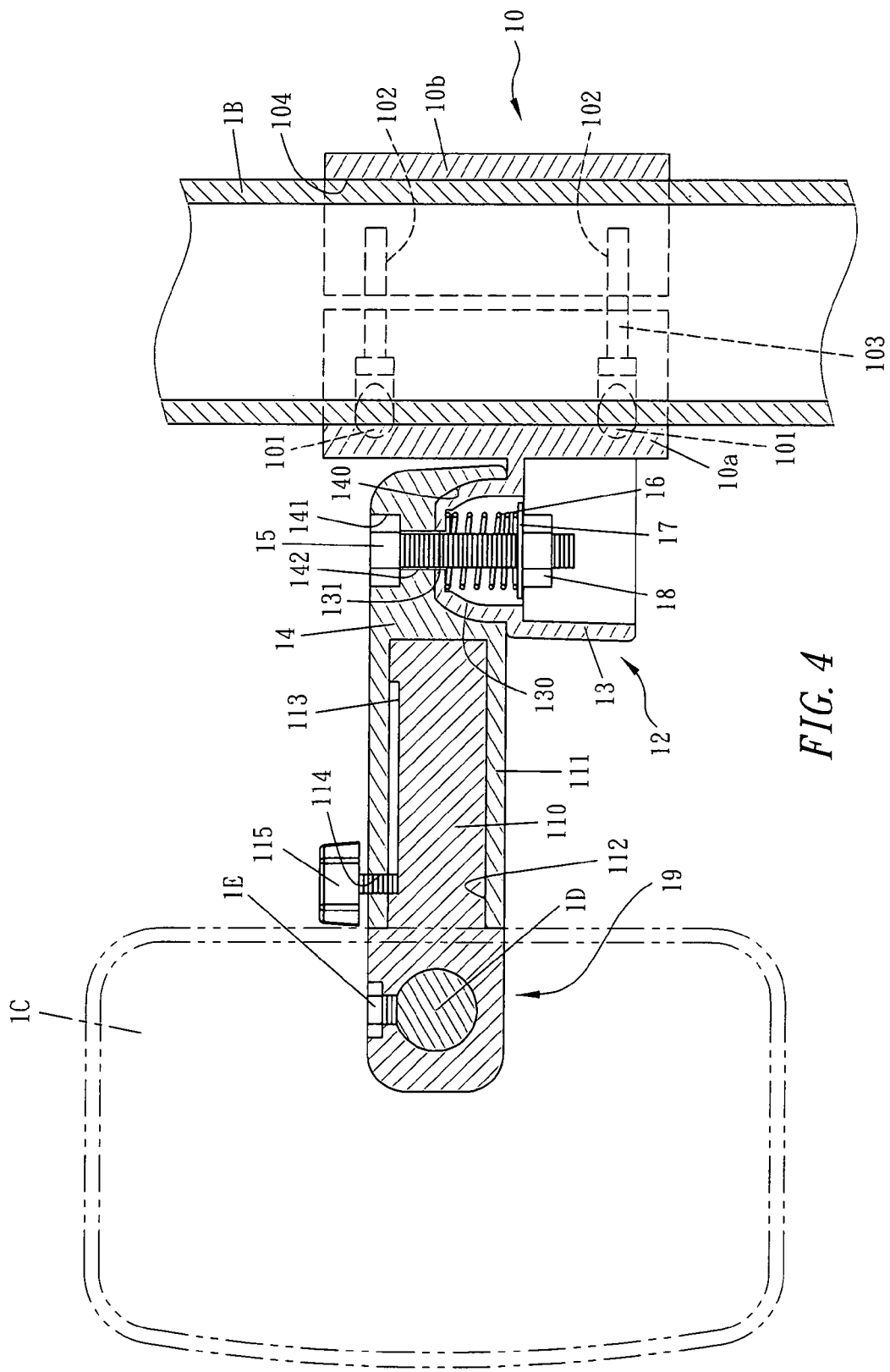
FIG. 4 is a sectional view showing the combination of the first embodiment of the present invention.

The length adjusting unit 11 has an end coupled with the mounting unit 10 by a combining unit 12 and an opposing end combined with a vehicle rearview mirror 1C by a joining unit 19, as shown in FIG. 4. Moreover, the length adjusting unit 11 includes an inserting member 110 and a receiving member 111, as shown in FIG. 3. An interior of the receiving member 111 is provided with a sliding channel 112 extending axially. The sliding channel 112 provides a channel opening 1120 facing the inserting member 110 to allow the inserting member 110 to insert into the sliding channel 112 via the channel opening 1120. The inserting member 110 provides a concave groove 113 extending axially. The receiving member 111 is provided with a threaded hole 114, which faces the concave groove 113, to allow insertion of a bolt 115. After the bolt 115 inserts into the threaded hole 114, an end surface of the bolt 115 may tightly touch a concave surface of the concave groove 113. Two short sides of the concave groove 113 are stop walls when the inserting member 110 is pulled outwards.

The mounting unit 10 includes a first fasten clamp 10a having a plurality of through holes 101, a second fasten clamp 10b having a plurality of screw holes 102, and a plurality of screw elements 103. The first and second fasten clamps 10a and 10b correspond to each other. A clamping space 104 is formed between the first fasten clamp 10a and the second fasten clamp 10b. The clamping space 104 is used for tightly grasping the fixed rod 1B of the vehicle body. The direction of the plurality of through holes 101 is perpendicular to the extending direction of the fixed rod 1B. The plurality of screw holes 102 respectively correspond to the plurality of through holes 101. The plurality of screw elements 103 is respectively inserted into the through holes 101 to be screwed to the screw holes 102 tightly. Thus, the first fasten clamp 10a and the second fasten clamp 10b are allowed to grasp the fixed rod 1B of the vehicle body.

The combining unit 12 includes a hollow connecting member 13, a hollow engaging member 14, a screw member 15, a spring 16, a washer 17 and a nut 18. The hollow connecting member 13, whose bottom end provides an opening, extends outwards from a lateral wall of the mounting unit 10. The top end of the hollow connecting member 13 is provided with a hemisphere-like element 130, whose center has a via hole 131. The hollow engaging member 14, extending outwards from a lateral wall of the length adjusting unit 11, provides a bottom end arranged with a hemisphere-like cavity 140 for receiving the hemisphere-like element 130 and a top end arranged with a hexagonal cavity 141 whose bottom center surface has a penetrating hole 142 linearly communicating with the via hole 131. The screw member 15 is inserted downwards into the penetrating hole 142 and the via hole 131, and then passes through the spring 16 and the washer 17 within the hollow connecting member 13 to be tightly screwed together with the nut 18. Thus, the length adjusting unit 11 is allowed to be combined with the mounting unit 10 by the combining unit 12.

The joining unit 19 is provided with a fixation aperture 190 penetrating through a body of the joining unit 19 and a tapped hole 191 which is perpendicular to the fixation aperture 190 and communicates with the fixation aperture 190. The fixation aperture 190 is used to receive a coupling rod 1D disposed on the backside of the vehicle rearview mirror 1C. The tapped hole 191 is used to receive a screw piece 1E whose end side is allowed to tighten the wall of the coupling rod 1D to position and fix the vehicle rearview mirror 1C, as shown in FIG. 4. Moreover, the angle of the vehicle rearview mirror 1C can be adjusted by loosening the screw piece 1E.

Figure 5:
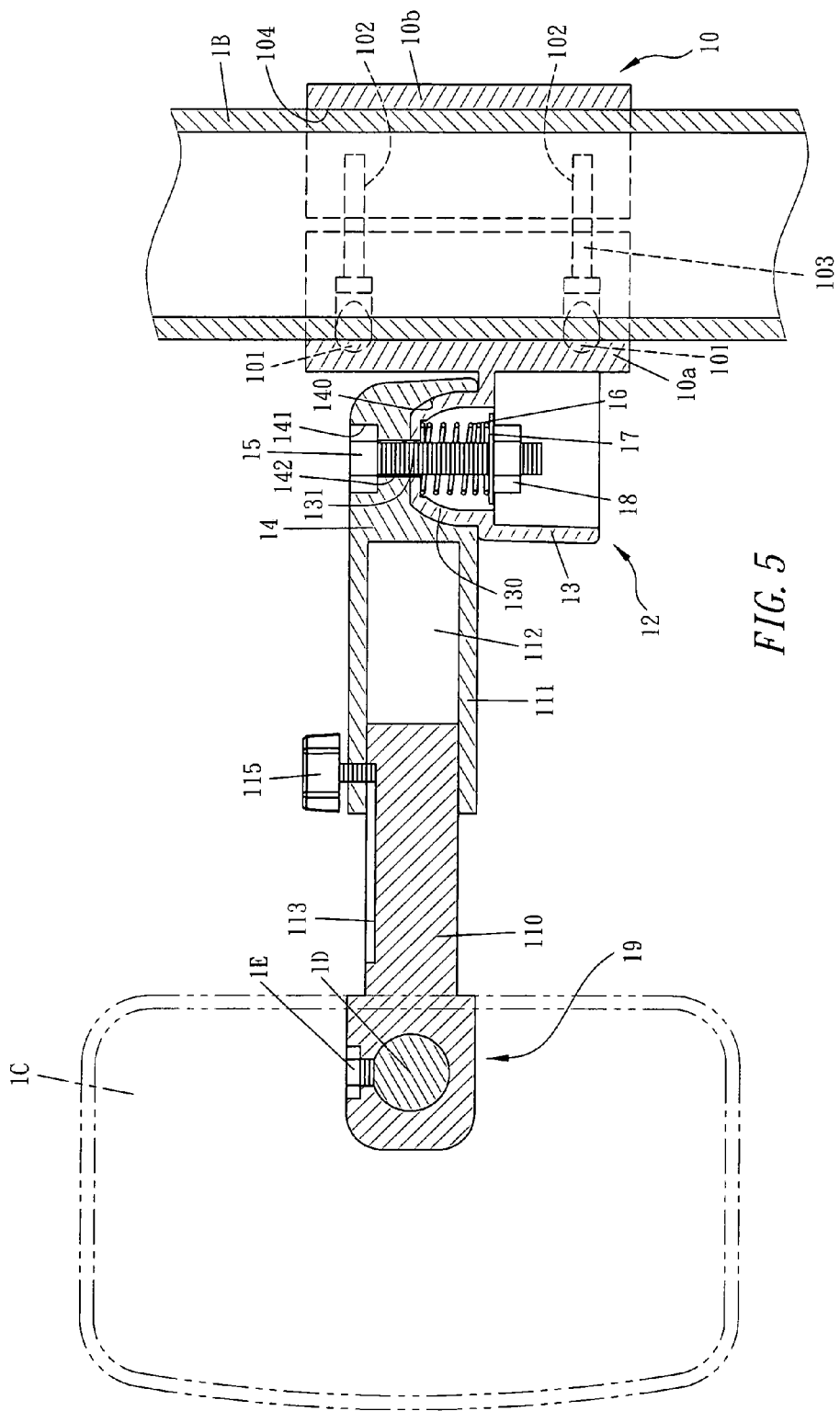
FIG. 5 is a schematic diagram showing the length adjustments according to the first embodiment of the present invention.
Figure 6:
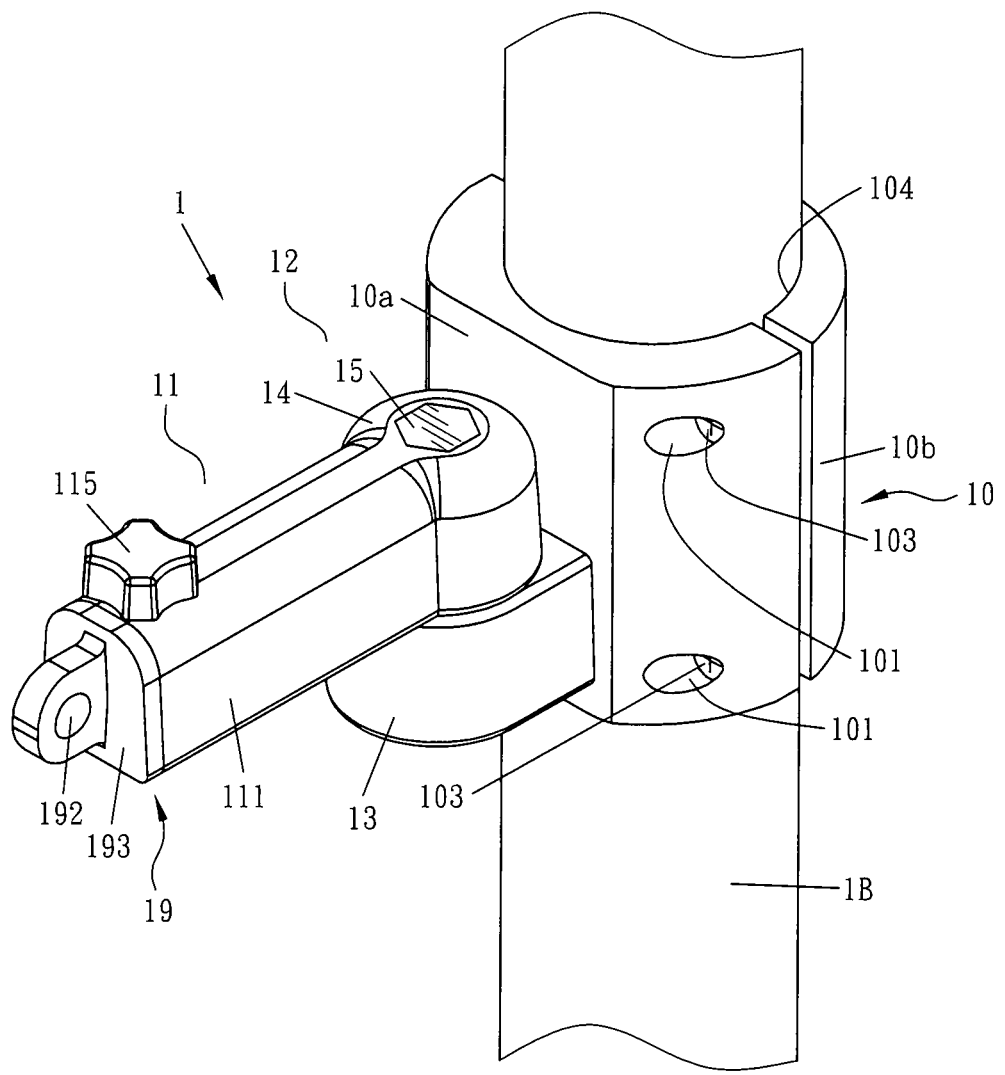
FIG. 6 is a stereogram showing the combination of a second embodiment of the present invention.
Figure 7:
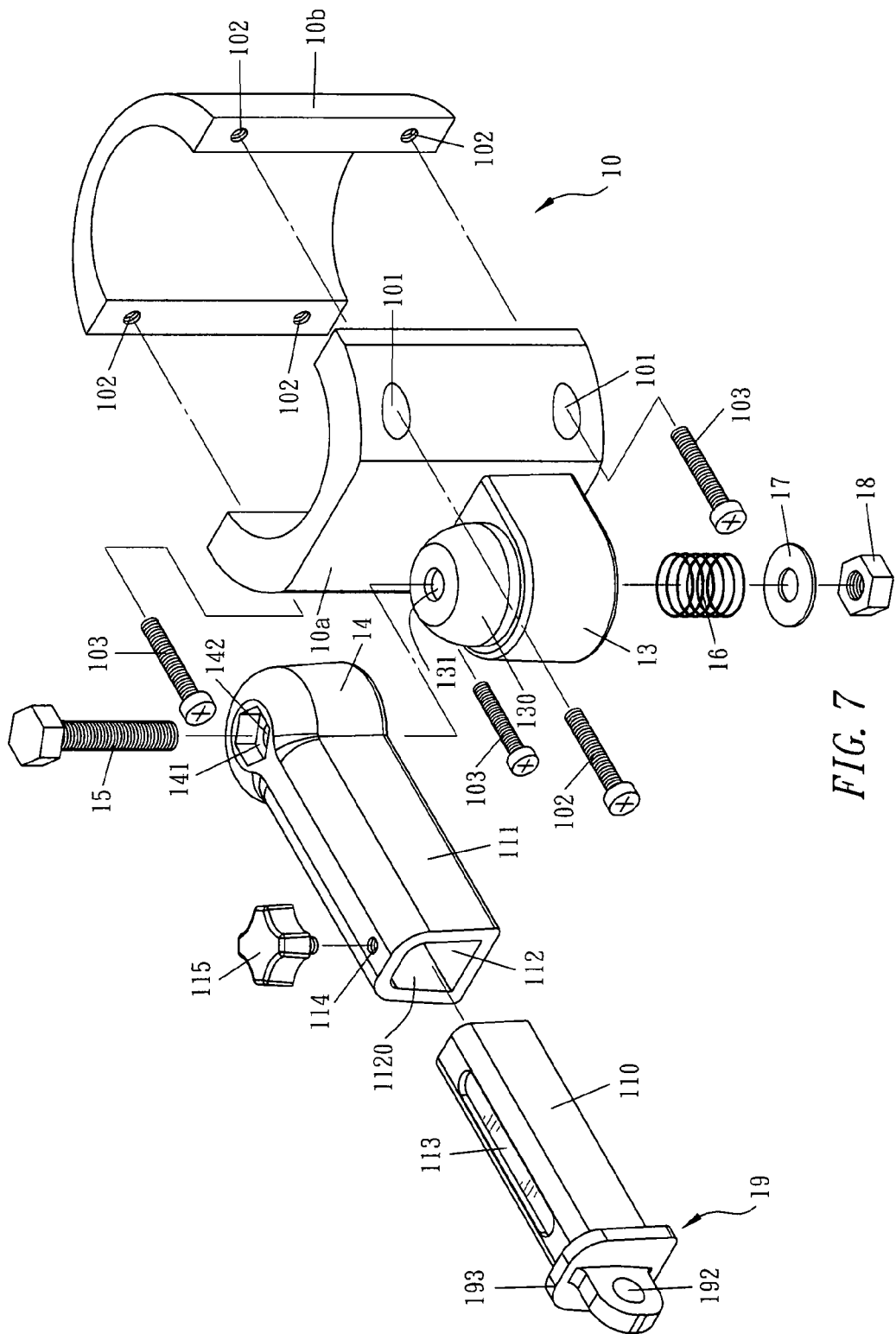
FIG. 7 is a breakdown stereogram of the second embodiment of the present invention.
Figure 8:
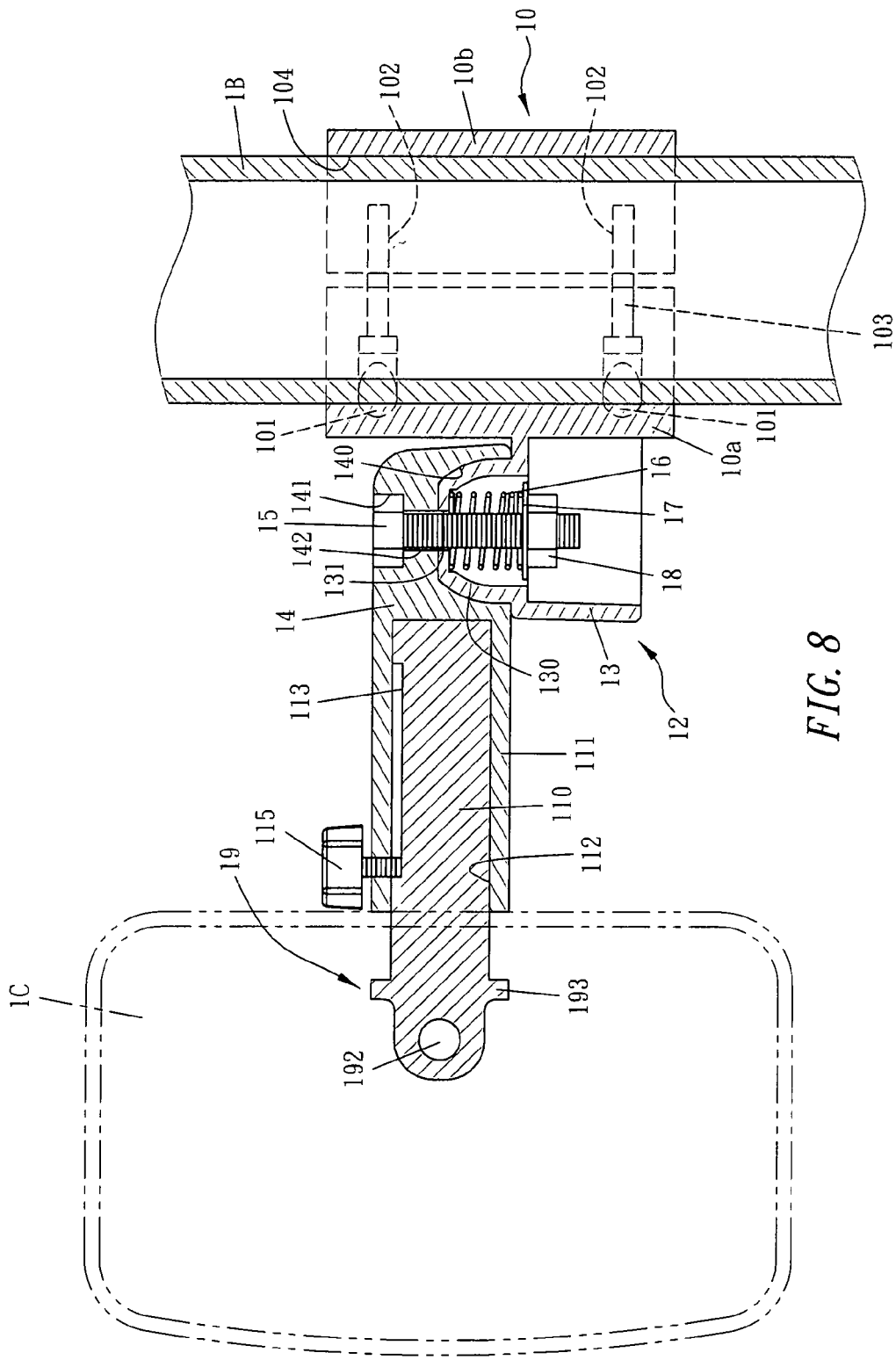
FIG. 8 is a sectional view showing the combination of the second embodiment of the present invention.
Figure 9:
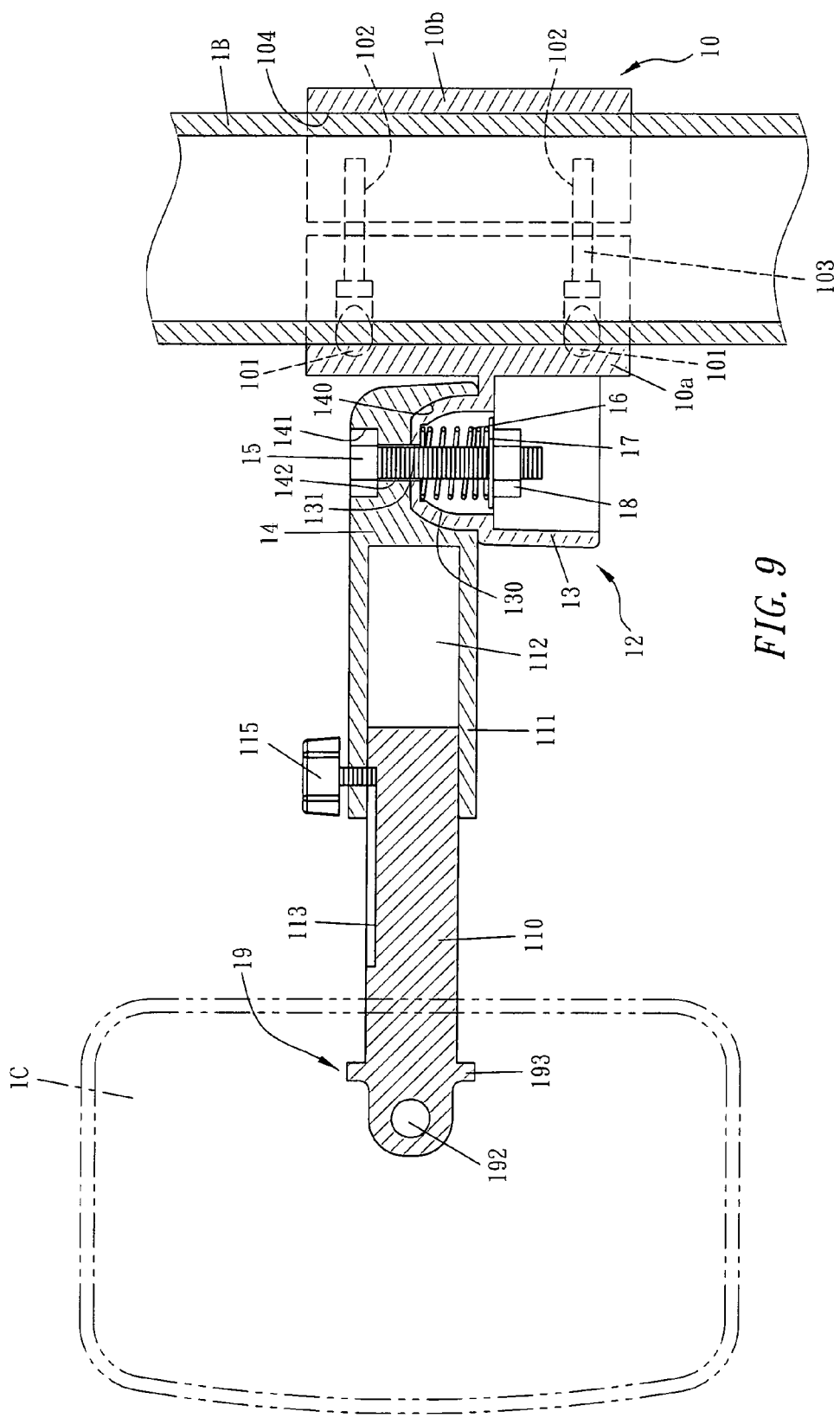
FIG. 9 is a schematic diagram showing the length adjustments according to the second embodiment of the present invention.

When the position and the linear distance between the rearview mirror 1C and the vehicle body 1A (the fixed rod 1B), to which the rearview mirror 1C is configured to need to be adjusted, a screw bolt 115 needs to be loosened first to enable the bottom end surface of the screw bolt 115 not to tightly touch the concave surface of the concave groove 113. Thus, the axial position of the inserting member 110 is allowed to be adjusted. After the position is set, the screw bolt 115 needs to be screwed again to tightly touch the concave surface of the concave groove 113 to position and secure the linear distance between the rearview mirror 1C and the vehicle body 1A (the fixed rod 1B), as shown in FIG. 4 and FIG. 5.

Furthermore, the hemisphere-like element 130 and the hemisphere-like cavity 140 of the combining unit 12 allow the length adjusting unit 11 to take the hemisphere-like element 130 as a center point to turn to adjust the angle of the vehicle rearview mirror 1C. The combination of the joining unit 19 and the vehicle rearview mirror 1C enables the angle of the vehicle rearview mirror 1C to be adjustable.

Different from the first embodiment, the joining unit 19 disclosed in a second embodiment of the present invention, as shown in FIG. 6 to FIG. 9, provides a fastening aperture 192 penetrating through the body of the joining unit 19 and a plate 193 between the fastening aperture 192 and the length adjusting unit 11 to fit in with a different backside combination structure of the rearview mirror 1C.

According to the mentioned above, the present invention may be used to adjust the rearview mirror 1C to a requested linear distance/position by loosening the screw bolt 115, and then to secure the rearview mirror 1C at the requested linear distance/position by screwing the screw bolt 115 to tightly touch the concave surface of the concave groove 113. Consequently, the linear distance/position is able to be adjusted to allow the driver to adjust a visibility range to eliminate blind spots and to improve vehicle safety.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

What is claimed is:

1. A position adjustment device for a vehicle rearview mirror, comprising:
a mounting unit used to combine together with a vehicle body; and
a length adjusting unit having an end coupled with the mounting unit by a combining unit and an opposing end combined with a vehicle rearview mirror by a joining unit; wherein the length adjusting unit includes an inserting member providing a concave groove extending axially and a receiving member whose interior is provided with a sliding channel providing a channel opening facing the inserting member to allow the inserting member to insert into the sliding channel via the channel opening; wherein the receiving member is provided with a threaded hole facing the concave groove to allow insertion of a bolt so that an bottom end surface of the bolt is allowed to tightly touch a concave surface of the concave groove after the bolt is screwed into the threaded hole, wherein the combining unit includes a hollow connecting member, a hollow engaging member, a screw member, a spring, a washer and a nut; wherein the hollow connecting member, having a bottom end provided with an opening and a top end arranged with a hemisphere-like element whose center has a via hole, extends outwards from a lateral wall of the mounting unit; wherein the hollow engaging member, including a bottom end providing a hemisphere-like cavity for receiving the hemisphere-like element and including a center having a penetrating hole linearly communicating with the via hole, extends outwards from a lateral wall of the length adjusting unit; and wherein the screw member is inserted into the penetrating hole and the via hole, and then passes through the spring and the washer within the hollow connecting member to be tightly screwed together with the nut.

2. The position adjustment device as claimed in claim 1, wherein the mounting unit includes a first fasten clamp and a second fasten clamp corresponding to each other, a plurality of through holes, a plurality of screw holes, a plurality of screw elements, and a clamping space formed between the first fasten clamp and the second fasten clamp for grasping a fixed rod of the vehicle body; wherein the plurality of through holes is arranged on the first fasten clamp and the plurality of screw holes is disposed on the second fasten clamp, wherein the plurality of screw holes respectively correspond to the plurality of through holes; and wherein the plurality of screw elements is respectively inserted into the plurality through holes to be fastened to the screw holes tightly to be secured to the fixed rod of the vehicle body.

3. The position adjustment device as claimed in claim 2, wherein the joining unit provides a fastening aperture penetrating through a body of the joining unit and a plate between the fastening aperture and the length adjusting unit.

4. A position adjustment device for a vehicle rearview mirror, comprising:
   a mounting unit used to combine together with a vehicle body; and
   a length adjusting unit having an end coupled with the mounting unit by a combining unit and an opposing end combined with a vehicle rearview mirror by a joining unit; wherein the length adjusting unit includes an inserting member providing a concave groove extending axially and a receiving member whose interior is provided with a sliding channel providing a channel opening facing the inserting member to allow the inserting member to insert into the sliding channel via the channel opening; wherein the receiving member is provided with a threaded hole facing the concave groove to allow insertion of a bolt so that an bottom end surface of the bolt is allowed to tightly touch a concave surface of the concave groove after the bolt is screwed into the threaded hole, wherein the mounting unit includes a first fasten clamp and a second fasten clamp corresponding to each other, a plurality of through holes, a plurality of screw holes, a plurality of screw elements, and a clamping space formed between the first fasten clamp and the second fasten clamp for grasping a fixed rod of the vehicle body; wherein the plurality of through holes is arranged on the first fasten clamp and the plurality of screw holes is disposed on the second fasten clamp, wherein the plurality of screw holes respectively correspond to the plurality of through holes; wherein the plurality of screw elements is respectively inserted into the plurality through holes to be fastened to the plurality of screw holes tightly to be secured to the fixed rod of the vehicle body.

5. A position adjustment device for a vehicle rearview mirror, comprising:
   a mounting unit used to combine together with a vehicle body; and
   a length adjusting unit having an end coupled with the mounting unit by a combining unit and an opposing end combined with a vehicle rearview mirror by a joining unit; wherein the length adjusting unit includes an inserting member providing a concave groove extending axially and a receiving member whose interior is provided with a sliding channel providing a channel opening facing the inserting member to allow the inserting member to insert into the sliding channel via the channel opening; wherein the receiving member is provided with a threaded hole facing the concave groove to allow insertion of a bolt so that an bottom end surface of the bolt is allowed to tightly touch a concave surface of the concave groove after the bolt is screwed into the threaded hole, wherein the joining unit is provided with a fixation aperture penetrating through a body of the joining unit and a tapped hole perpendicular to and communicating with the fixation aperture; and wherein the fixation aperture is used to receive a coupling rod disposed on a backside of the vehicle rearview mirror and the tapped hole is used to receive a screw piece whose end side allows to tighten a wall of the coupling rod.

\* \* \* \* \*